May 20, 1958  J. M. WARD  2,835,107
RESINS AND USE THEREOF
Filed Dec. 21, 1956  2 Sheets-Sheet 1
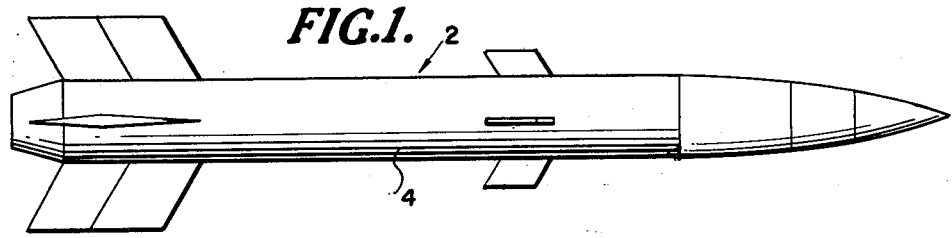
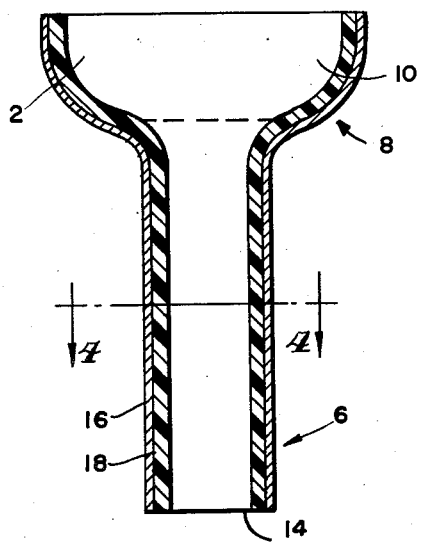
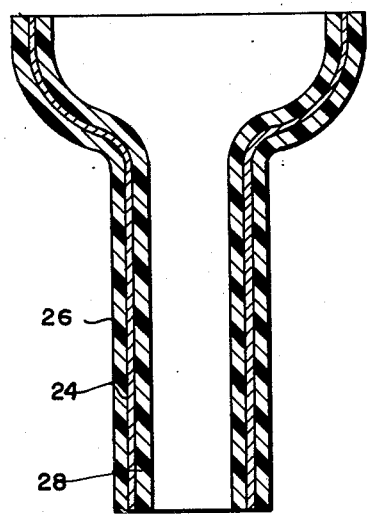
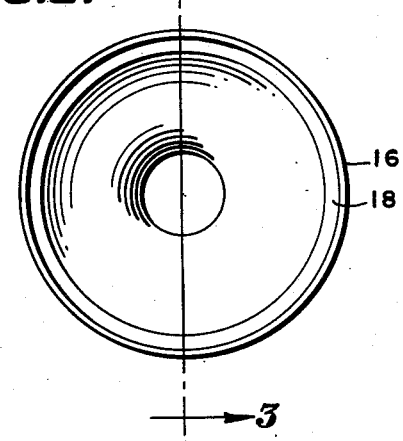
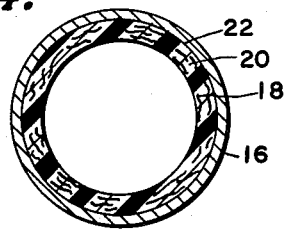
INVENTOR
JOHN M. WARD May 20, 1958 J. M. WARD 2,835,107
RESINS AND USE THEREOF
Filed Dec. 21, 1956 2 Sheets-Sheet 2
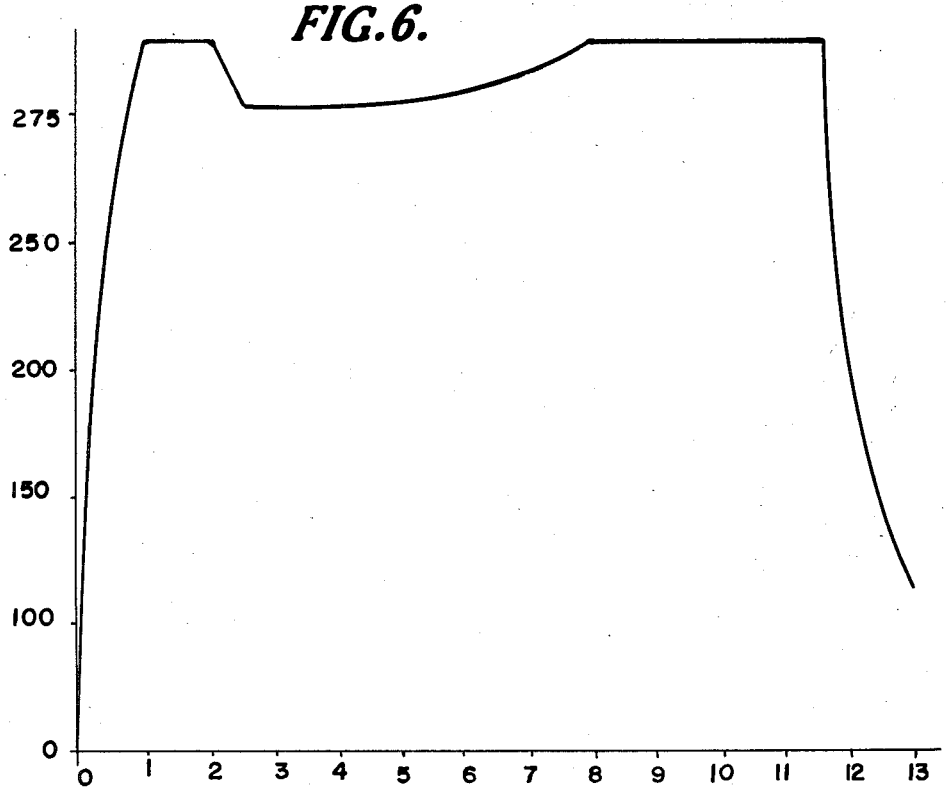
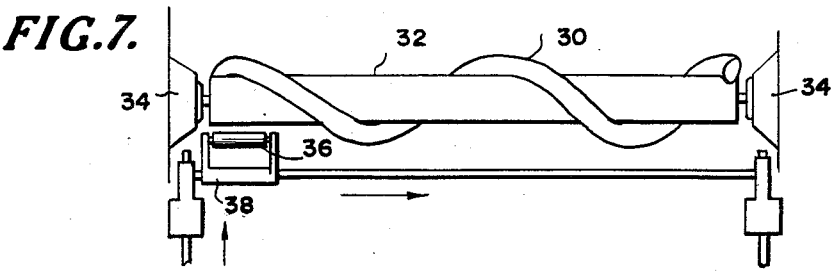
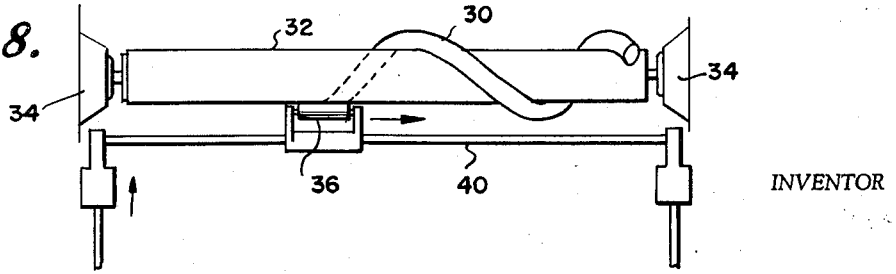
INVENTOR
JOHN M. WARD
BY Cushman Darby & Cushman
ATTORNEYS

United States Patent Office 2,835,107
Patented May 20, 1958

2,835,107

RESINS AND USE THEREOF

John M. Ward, Westfield, N. J., assignor to Haveg Industries, Inc., Wilmington, Del., a corporation of Delaware Application December 21, 1956, Serial No. 629,991

18 Claims. (Cl. 60—35.6)

This invention relates to the preparation of rockets.

Certain parts of rockets are required to stand extremely high temperatures, generally over 2000° F. and frequently as high as 5000° F., for times as short as 0.1 second or in some instances as long as several minutes. At the present time, no completely satisfactory material has been developed to resist the high temperatures encountered by the rocket.

It is an object of the present invention to provide a material which will withstand the high temperatures encountered by the rocket.

A more specific object is to provide a material which will withstand the temperatures encountered in combustion of rocket fuels.

A further object is to provide tubes made of novel materials for the passage of hot combustion products from the combustion zone.

A still further object is to provide a plastic liner for a metal rocket tube.

Yet another object is to provide a material which will withstand the corrosive action of the products of combustion.

An additional object is to provide a material which will insulate other vulnerable parts of the rocket construction from the heat developed in the combustion chamber and other areas exposed to the products of combustion.

Another object is to prevent errosive action upon the parts of a rocket or other combustion chamber which are subjected to high temperatures and high gas velocities.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by making the parts which must resist high temperatures and corrosion out of a mixture of a thermosetting synthetic resin and a fire-resistant inorganic fiber material. While the invention is preferably employed to make a plastic liner for a rocket having an outer shell of metal or other material, it also is possible to form the various other tubes, deflectors, cross-overs, throat pieces, tube insulator sustainers, bulkheads, insulators, boosters, nozzles, etc. of the novel thermosetting resin-inorganic fiber combinations. In fact, in some instances, the rocket tube itself can be made of the thermosetting resin-inorganic fiber and thus dispense with the necessity of having a liner.

When a rocket is fired through the atmosphere, a tremendous amount of heat is generated on the surface of the rocket. The resin and fiber composition can be employed therefore as a covering for the outside of the rocket to enable it to get through our atmosphere.

A critical feature of the invention as applied to rocket liners and other tubular pieces in which the gas velocities are abnormally high is that the inorganic fibers are substantially all oriented in a direction circumferential of the liner or tube.

In the drawings:

Figure 1 is a plan view of one form of rocket according to the invention;

Figure 2 is a top plan view of the discharge end of a rocket;

Figure 3 is a longitudinal section on the line 3—3 of Figure 2 having an inner liner made according to the present invention;

Figure 4 is a section on the line 4—4 in Figure 3;

Figure 5 is a view similar to Figure 3 wherein the rocket has both an internal covering and an external covering made according to the invention;

Figure 6 is a graph showing a typical curing cycle;

Figure 7 is a top elevation showing an initial stage in the method of forming a rocket liner; and Figure 8 is a view similar to Figure 7 showing a more advanced stage in the formation of the rocket liner.

Referring more specifically to the drawings, there is shown a rocket 2 which can have its shell 4 molded of a thermosetting synthetic resin, e. g., a phenol-formaldehyde resin, and inorganic fibrous filler, e. g., asbestos, with the fibers oriented substantially circumferentially of the shell.

As shown in Figures 2 and 3, the discharge end 6 of the rocket 8 includes propellant chamber 10 filled with solid propellant 12 and discharge nozzle 14. The rocket has a metal casing 16 and an inner liner 18 made of a thermoset phenol-formaldehyde resin 20 and an asbestos fiber filler 22. The fibers are oriented substantially circumferentially of the liner, as is best shown in Figure 4.

Figure 5 shows an alternative construction wherein the casing 24 of metal or other material has a protective coating 26 of the resin-oriented inorganic fiber composition, as well as an inner liner 28 of the resin-fiber composition.

As previously stated, for outstanding results the inorganic fibers, e. g., asbestos fibers, should be oriented circumferentially of the tube. If, on the contrary, the asbestos fibers are oriented in a direction parallel to the longitudinal axis of the tube or liner (for example, by extrusion of the plastic-fiber composition onto a mandrel as the plastic travelled in a direction parallel to the longitudinal axis of the mandrel), the tube does not come up to requirements because of the scouring action of the high velocity gases which form channels in the walls of the plastic.

The asbestos fibers can be oriented circumferentially of the tube in the manner shown in Figures 7 and 8 wherein the phenol-formaldehyde resin-asbestos fiber mixture in the form of a ribbonous, doughy mass 30 is draped around rotatable mandrel 32 which is connected to lathes 34. After the doughy mass is draped around the mandrel, the mandrel is set into rotation with the aid of a motor (not shown). Idle roller 36 on tool rest 38 is then brought in contact with the doughy mass and the latter is squeezed between the idle roller and the rotating mandrel. By this procedure, it has been found that the asbestos fibers become oriented circumferential of the mandrel. The idle roller is moved along bar 40 back and forth during the process of shaping the resin-fiber composition into a finished rocket liner. By this procedure of spinning, it has been found possible to orient approximately 80% of the fibers circumferentially of the roller.

The inorganic fiber can be asbestos of a wide variety of types, ranging from long fiber chrysotile to short fiber amphibole types. The latter types include anthophyllite, amosite, etc. The presently preferred form of asbestos is the anthophyllite variety which has been treated to eliminate acid soluble metallic constituents, and this form of asbestos was used in the specific examples.

The anthophyllite asbestos can be treated to eliminate acid solubles in the following manner:

500 pounds of the asbestos fiber are loaded into a closed reactor equipped with an agitator. The asbestos is covered with a solution of 20% hydrochloric acid which is brought to boiling and the mixture is maintained at reflux for 2 hours with gentle agitation.

The extracted asbestos mixture is then poured onto a glass filter cloth and the liquid removed with the aid of a vacuum in conventional fashion. The asbestos is then washed thoroughly with water and dried in either a tray drier or a rotary drier. The dried product is then ready for mixing with the resin.

With acid curing resins more reproducible results are obtained using this acid washed asbestos, although it should be understood that the acid washing can be omitted, particularly with resins which are not acid curing.

The use of fibrous asbestos which is circumferentially oriented permits a mass molding technique. It is possible to obtain good flexibility, and it is also possible to cut into the material without impairing the strength. This is in contrast to those procedures wherein glass cloth or similar material is employed rather than the asbestos fibers. In addition, the present product is less expensive to make than one employing cloth, and it is possible to form products with all kinds of shapes. The asbestos fibers are not felted and preferably are of the hard, short fiber type.

If there are any chips, gaps, cracks, flaws or pock marks in the finished product, it is possible to fill these spots with a cement made from a cold acid catalyzed phenol-formaldehyde resin, furane resin or other resin. This is an additional advantage of the present type of materials.

The preferred thermosetting resins are phenol-formaldehyde resins. In the examples, a one-stage, alkali catalyzed phenol-formaldehyde resin was employed, but there can also be used two-stage phenol-formaldehyde condensates wherein a novolak, for example, is cured to the finished state by addition of a catalyst or curing agent such as a formaldehyde source, e. g., paraformaldehyde, hexamethylenetetramine or trioxane. For example, to a novolak made from 1 mol of phenol and 0.83 mol of formaldehyde there can be added 15% by weight of the novolak of hexamethylenetetramine as a curing agent.

Other thermosetting phenolic resins can also be used, e. g., phenol-furfural, m-cresol formaldehyde, cresylic acid formaldehyde, xylenol formaldehyde, e. g., 3,5-dimethylxylenol formaldehyde, as well as mixed xylenol formaldehyde resins, resorcinol-formaldehyde, etc. Furthermore, other thermosetting resins can be employed such as urea-formaldehyde resin, aminotriazine-aldehyde resins, e. g., melamine-formaldehyde, furfuryl alcohol resins, furfuryl alcohol formaldehyde resins, furfuryl alcohol furfural resins, etc. Epoxy resins can also be employed.

The epoxy resins suitable for use in the compositions of the invention include those described in U. S. Patents Nos. 2,528,417, of October 31, 1950, and 2,500,449, of March 14, 1950, i. e., they contain along with ethereal oxygen, glycidyl groups in such quantity that the material has a 1,2-epoxy equivalency in the average molecule, of greater than one. By the epoxy equivalency, reference is made to the average number of 1,2-epoxy groups.

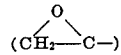

contained in the average molecule of the ether.

A preferred group of epoxy ethers for use in the invention is prepared by reacting a dihydric phenol with epichlorhydrin in alkaline solution. These products are of resinous character and in general are solid materials at normal temperature (20–30° C.). Any of the various dihydric phenols are used in preparing these glycidyl ethers, including mononuclear phenols like resorcinol, catechol, hydroquinone, etc., or polynuclear phenols like bis-(4-hydroxyphenyl)-2,2-propane (bis-phenol), 4,4′-dihydroxy benzophenone, bis - (4 - hydroxyphenyl) - 1,1 - ethane, bis-(4-hydroxyphenyl)-1,1-isobutane, bis-(4-hydroxyphenyl) - 2,2 - butane, bis - (4 - hydroxy - 2 - methylphenyl)-2,2-propane, bis-(hydroxy-2-tertiary butyl-phenyl) - 2,2 - propane, bis - (2 - dihydroxy - naphehyl) - methane, 1,5-dihydroxy naphthalene, etc. The product may be represented by the formula:

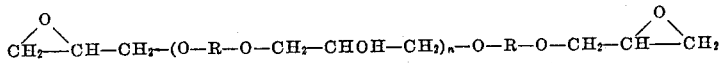

wherein $n$ is an integer, preferably from 1 to 7, and R represents the divalent hydrocarbon radical of the dihydric phenol. The preferred epoxy ethers for use in the invention are those having epoxy values no less than 0.20 (Pyridinium Chloride Method), and melting points no greater than 80° C. (Durran's Mercury Method). The preferred phenol is bis-phenol A.

There can also be used 1,2-epoxy-containing polyethers of polyhydric alcohols, such as polyglycidyl ethers thereof, like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols having a 1,2-epoxy equivalency greater than one, such as the polyglycidyl ethers of glycol, diglycerol, erthritol, pentaglycerol, mannitol, sorbitol polyallyl alcohol, polyvinyl alcohol, and the like.

In general, the glycidyl ether resin will have an epoxy equivalency greater than 1 and usually less than 2. The epoxy equivalency may be defined as the number of epoxy groups per molecule in contrast to the epoxy value which is the number of epoxy groups in 100 grams of the resin.

The preferred epoxy resin is made from a bisphenol A epichlorhydrin. The resins are preferably cured with aromatic amines, e. g., benzyl dimethyl amine. While the phenol aldehyde resins can be cold catalyzed, the epoxy resins should be heat cured.

Resins such as polymerized triallyl cyanurate resins, diethylene glycol bisallyl carbonate resins and diallyl phthalate resins can be used. Polyester resins can also be used. These polyester resins contain two major components, a linear unsaturated polyester and a polymerizable vinyl (or vinylidene) monomer which dissolves in the polyester and is subsequently polymerized along with the completion of the cure of the polyester. The polyester can be made from glycols such as ethylene glycol, diethylene glycol, propylene glycol, dipropylene glycol, 2,3-butanediol, 1,3-butanediol, trimethylene glycol and unsaturated dibasic acids such as maleic acid, fumaric acid, cis-3,6-endomethylene-$\Delta^4$-tetrahydrophthalic acid, hexachloroendomethylene tetrahydrophthalic acid, itaconic acid, citraconic acid, etc. A portion of the unsaturated acid can be replaced by saturated aliphatic or aromatic dibasic acids such as succinic acid, adipic acid, azelaic acid, sebacic acid, phthalic acid and tetrachlorophthalic acid. As the vinyl or vinylidene monomer component there can be used styrene, the vinyl toluenes, e. g., o-vinyl toluene, alpha-methyl styrene, triallyl cyanurate, diallyl phthalate, methyl methacrylate, vinyl acetate, o-chlorostyrene, o-fluorostyrene, 3,5-dichlorostyrene. A typical example of such a polyester resin is a styrene modified condensation product of propylene glycol with a mixture of phthalic anhydride and maleic anhydride.

In the present invention the inorganic fiber can be present in an amount from 35% to 60% and the thermosetting resin in an amount from 40% to 65% in the composition used to prepare the rocket parts. Preferably, the inorganic fiber and thermosetting resin are used in approximately equal amounts.

In the specification and claims, unless otherwise stated, all percentages and parts are by weight.

In Examples 1 and 2 are given typical examples of preparing the thermosetting resins which can be employed in the present invention.

Example 1

104 lbs. of phenol and 109 lbs. of 37% aqueous formaldehyde were placed in a vessel. This mixture was heated by steam until the temperature reached 100° F., 20 lbs. of water were added to the vessel and heating continued and when the temperature reached 150° F., a mixture of 790 grams sodium hydroxide and 4000 cc. of water were added. The mixture was heated slowly until the reaction started at about 175° F. Then the steam was turned off until the reaction became less violent. The temperature was then maintained between 200° F. and 215° F. for 90 minutes after refluxing began. The steam pressure was not allowed to exceed 3 lbs./sq. in. (gauge). At the end of the 90 minute period, the steam was released and cooling water turned on. The temperature was allowed to drop to about 140° F. before starting the distillation. The vacuum was maintained between 20 and 30 inches. The temperature was brought to 125° F. at 28.5 inches of vacuum and the water distilled off. Distillation was continued for 20 minutes. In all, about 7.2 gallons of water were distilled off. Then the vacuum was turned off and air admitted to the kettle.

Example 2

1500 grams of furfuryl alcohol, 750 grams of 37% aqueous formaldehyde and 12 cc. of dilute phosphoric acid (1 vol. 85% $H_3PO_4$ to 2 vol. of water) were mixed together and the system heated with a water condenser attached at 86 to 98.5° C. for 90 minutes. The resin was then partially neutralized to a pH of 4 to 5 with aqueous sodium hydroxide, cooled to 70° C. and dehydrated in vacuo. The yield was 1674 grams of dark viscous resin. This resin was soluble in ethyl acetate. It was rapidly thermosetting with heat and strong organic acids. Thus, 1% maleic acid or maleic acid at 250 to 300° F. was a good catalyst for curing the liquid resin.

The presently preferred resins are phenolformaldehyde resins. The resins can be either liquid or solid, but preferably are liquid resins having solids contents of 50 to 95%.

Example 3

A rocket liner was formed from a mixture of 48% of a phenol-formaldehyde resin having a viscosity of 50,000 centipoises (prepared as described in Example 1) and 52% of the anthophyllite variety of amphibole asbestos which had been previously treated with strong, hot hydrochloric acid to remove essentially all the acid solubles in the manner previously described.

This mixture of phenol-formaldehyde resin and asbestos was a plastic mass which was then applied to the outside of a steel tube or mandrel in a manner to insure that the orientation of the asbestos fibers was essentially circumferential. The mandrel had an outside diameter of 1.875 inches and the plastic was applied to the mandrel outer surface by dropping the plastic mixture thereon in contact with a longitudinally travelling roller while the mandrel was rotated or spun at a speed of 100 R. P. M. until the plastic was built up to a depth of 0.375 inches, as shown in Figures 7 and 8. In this way, the asbestos fibers were oriented circumferentially of the mandrel.

The resultant formed plastic with its mandrel was heated in an autoclave to complete the polymerization at a pressure of 110 p. s. i. gauge. The temperature was raised over a period of about an hour to 275° F. The preheat temperature was maintained at 275° F. for a little over an hour and then was reduced to 240° F. over 15 minutes, during the subsequent period while the exotherm was occurring within the piece. Following the subsidence of the exotherm, the temperature was raised at an orderly rate to the curing level of 275° F. The period of reduced temperature and gradual rise took about 5½ hours. Curing was then completed at 275° F. for 4 hours. The pressure was released and the mandrel was then withdrawn from the solid, cured tubular object, i. e., the rocket liner, and the liner thus formed was then ready for use in the rocket. The temperature time cycle of curing is shown in Figure 6.

The liner was placed in the metal rocket tube by cooling the plastic sufficiently for it to shrink slightly in size so that it would fit inside the metal tube. (Alternatively, the metal tube could be heated to expand it in size or a combination of cooling the plastic liner and heating the metal tube can be employed.) In this manner when the two units are placed together and the temperature of both becomes the same, there is a tight fit between the liner and the metal tube. While it is not necessary to use an adhesive to bond the liner to the other portions of the rocket, if desired, such an adhesive, e. g., an epoxy resin such as a bis-phenol A epichlorhydrin resin, can be employed.

It has been found that in forming the plastic parts, it is necessary to control the temperature during the cure so as to obtain complete polymerization, while at the same time avoiding the stimulation to exothermic temperature peaks which develop gas pressures in excess of the autoclave pressure, thereby producing internal blisters.

The exact temperature cycle is a function of the thickness of the piece and the heat responsive characteristics of the resin chosen.

With phenolic resins of thickness ¼ in. to 2½ inches, the preheat temperature of the air in the autoclave is usually between 270° F. and 275° F. The temperature is then dropped 30 or 35° F. to 240° F. during the exothermic temperature peak period and then is raised to between 270° F. and 280° F. for the final cure.

The rocket tube blast liner prepared in Example 3 was placed in service with a metal rocket tube in the manner described and was fired at a temperature of over 4000° F. The velocity of the gases in the tube was about 0.7 to 1.5 times the velocity of sound and the phenol-formaldehyde-asbestos fiber liner withstood the blast and the heat of the gases during the entire flight period. The tube, on recovery, was examined and found to be intact within the limits of burning times normally encountered in blast tubes (0.1 second to several minutes). A carbonized surface layer on the liner protected the remainder of the tube against erosion and further decomposition. The average loss of wall thickness was about ⅛ inch during firing. The outside surface of the liner tube was completely unchanged as were the parts of the rocket which required protection from the heat, blast and corrosion of the combustion gases. Not only did the liner tube perform its function in withstanding and conveying the products of combustion, but it also provided more than adequate insulation for the other parts of the rocket.

For the longer burning times, it is only necessary to make the liner tube thicker so that it will withstand the longer period of burning. Generally, the average loss of liner wall thickness is about ¼ inch for each minute of flight.

In other tests the temperatures to which the rocket blast tubes were subjected were well above 2000° F., generally being between 3000 and 5000° F.

The rocket tube lines (and other rocket parts) can also be made by pressure molding, providing the asbestos or other inorganic fibers employed are oriented so as to be circumferential of the finished tubular liner.

While applicant does not wish to be limited as to the theory causing the success of the present invention, it appears that a compound is formed between the high melting inorganic metal silicate (asbestos) and the specific organic thermosetting synthetic resin binders. The binders decompose or react with the silicates at the high temperatures encountered to form an entirely new surface which is in the form of a molten inorganic surface at the temperatures maintained by the combustion of the rocket fuel. The heat which is transferred from the gas phase to the rocket tube itself is reduced by several different factors:

(1) The surface and sub-surfaces of the tube reflect a large quantity of heat back into the gas stream. Each layer of silicate is a different and additional reflector.

(2) The compound itself is of fairly low $k$ factor so that heat transmission is slow and successive layers of solid compound behind the molten silicate add insulation.

(3) The discontinuous nature of a compound makes heat transfer many times slower than that which would take place if it were a continuous compound. This latter factor appears to be extremely important. It seems that in the present invention many discontinuous phases of high melting silicates are put together and it is this which results in a much more effective high temperature operation than would result if a continuous phase silicate, such as a reinforced polyester glass fiber mat laminate having interwoven fibers, were used to form the tube or even if the tube were made from an asbestos mat having continuous asbestos fibers. In other words, it appears to be important that the composition contain a high melting inorganic substance such as metallic oxides or silicates, e. g., asbestos and mica or related materials, put together with a thermosetting synthetic resin binder in order to form a compound which is made up of a plurality of discontinuous phases.

I claim:

1. In a combustion chamber resistant to high temperature of the type operable to be subjected to a temperature above 2000° F., the improvement which comprises at least a portion of the combustion chamber which is subjected to a temperature above 2000° F. being made of a combination of inorganic fibers and thermosetting synthetic resin.

2. The improvement in a combustion chamber according to claim 1 wherein the inorganic fibers are asbestos fibers.

3. A combustion according to claim 2 wherein the synthetic resin is a phenol-formaldehyde resin.

4. A combustion chamber according to claim 1 wherein the synthetic resin is an aminotriazine-aldehyde resin.

5. A combustion chamber according to claim 1 wherein the inorganic fibers are silicate fibers.

6. A combustion chamber according to claim 5 wherein the silicate fibers are acid extracted silicate fibers.

7. In a rocket of the type including a discharge end and an inner liner for said discharge end, the improvement comprising said liner being made of a composition comprising inorganic fibers and a thermosetting synthetic resin, said inorganic fibers being substantially oriented in a direction circumferential of the liner.

8. A rocket according to claim 7 wherein the inorganic fibers are asbestos.

9. A rocket according to claim 8 wherein the synthetic resin is a phenol-formaldehyde resin.

10. A rocket according to claim 7 wherein the inorganic fibers are asbestos fibers and the synthetic resin is a melamine-formaldehyde resin.

11. A rocket according to claim 7 wherein the inorganic fibers are asbestos fibers and the synthetic resin is a cresol formaldehyde resin.

12. A rocket according to claim 7 wherein the inorganic fibers are asbestos fibers and the synthetic resin is a furfuryl alcohol-aldehyde resin.

13. A rocket having an outside shell wherein at least a portion of said outside shell which is subjected to a temperature above 2000° F. when the rocket is fired through the atmosphere is made of a combination of an inorganic fiber and a thermosetting synthetic resin.

14. In a combustion chamber resistant to high temperature of the type operable to be subjected to a temperature above 2000° F., including a discharge end, the improvement which comprises at least a portion of the interior of the discharge end being made of a combination of inorganic fibers and thermosetting synthetic resin.

15. A combustion chamber according to claim 14 wherein the inorganic fiber is asbestos and the synthetic resin is a phenol formaldehyde resin.

16. In a combustion chamber resistant to high temperatures, the improvement which comprises means for protecting the portions of said combustion chamber which are subjected to a temperature of at least about 2000° F., said means including a plurality of layers of discontinuous phase including a high melting inorganic metallic silicate and a thermosetting organic synthetic resin binder.

17. A combustion chamber according to claim 16 wherein the high melting inorganic silicate is an acid extracted silicate.

18. In a combustion chamber resistant to high temperatures, the improvement which comprises means for protecting the portions of said combustion chamber which are subjected to a temperature of at least about 2000° F., said means including a plurality of layers of discontinuous phase including a high melting inorganic metallic oxide and a thermosetting organic synthetic resin binder.

References Cited in the file of this patent

UNITED STATES PATENTS

| | | |
|---|---|---|
| 2,383,793 | Harvey et al. | Aug. 28, 1945 |
| 2,572,252 | Erasmus et al. | Oct. 23, 1951 |
| 2,653,920 | Harford | Sept. 29, 1953 |
| 2,683,667 | Utter | July 13, 1954 |
| 2,699,036 | Nicholson | Jan. 11, 1955 |
| 2,744,043 | Ramberg | May 1, 1956 |
| 2,768,408 | Strigle et al. | Oct. 30, 1956 |

FOREIGN PATENTS

| | | |
|---|---|---|
| 757,890 | Great Britain | Sept. 26, 1956 |

OTHER REFERENCES

Encyclopedia of Chemical Technology, volume 10, by Kirk-Othmer, page 348. (Copy in Library)